United States Patent [19]
Luniewicz et al.

[11] Patent Number: 5,694,015
[45] Date of Patent: Dec. 2, 1997

[54] HUNTING SUPPRESSOR FOR POLYPHASE ELECTRIC MOTORS

[75] Inventors: Michael F. Luniewicz, Bedford; Dale T. Woodbury, Belmont; Paul A. Tuck, Sharon, all of Mass.

[73] Assignee: The Charles Stark Draper Laboratory, Inc., Cambridge, Mass.

[21] Appl. No.: 552,066

[22] Filed: Nov. 2, 1995

[51] Int. Cl.[6] ........................................ G05B 5/01
[52] U.S. Cl. ........................ 318/611; 318/608; 318/702
[58] Field of Search .................................. 318/606, 608, 318/611, 702, 705, 723, 724

[56] References Cited

U.S. PATENT DOCUMENTS

| | | | |
|---|---|---|---|
| 4,143,311 | 3/1979 | Lee | 318/611 |
| 4,250,442 | 2/1981 | McCammon | 318/723 |

*Primary Examiner*—Bentsu Ro
*Attorney, Agent, or Firm*—Lappin & Kusmer LLP

[57] ABSTRACT

The disclosed hunting suppressor is for use with n-phase electric motors including a stator having n windings and a rotor. The hunting suppressor is responsive to a reference clock signal characterized by a frequency $f_c$ and an associated phase angle $\phi_c$.

A controlled frequency oscillator generates n drive signals, where the drive signals are mutually shifted in phase by 180/n degrees. The drive signals are each coupled to drive a respective one of the n windings of the motor. A phase locked loop network locks the frequency and phase of one of the drive signals to that of an applied clock reference signal. With that configuration, the rotor is controlled to rotate at the frequency of the clock reference signal with substantially no hunting.

17 Claims, 2 Drawing Sheets

HUNTING SUPPRESSOR FOR POLYPHASE ELECTRIC MOTORS

BACKGROUND OF THE DISCLOSURE

The present invention relates to electric motors. More particularly, the invention relates to a hunting suppressor for use with polyphase electric motors.

In many systems that use electric motors, it is desirable to drive the rotor of a motor at a constant frequency. However, in practice, the angular velocity of the rotor tends to drift both above and below the desired frequency. This behavior of drifting around a desired, or target, frequency rather than rotating exactly at the target frequency is commonly referred to as "hunting". Hunting, even when of an extremely small magnitude, is an important source of error and noise for high precision systems. By way of example, many systems use gyroscopes as a critical component; for example, inertial reference systems, precision gimbal pointing systems, and rotational vibration sensors. Gyroscopes generally include gimbals or rotors which are driven by a motor to rotate, ideally at a single desired frequency. In a gyroscope, rotor hunting manifests itself by periodic sinusoidal error in the gyroscope's output. In prior art gyroscopes, hunting suppression has been attempted by sensing motor current amplitude and feeding back that amplitude to control the motor drive current amplitude. This approach is only slightly effective. Alternatively, motor current phase has been sensed and fedback to control motor drive current amplitude. This approach requires tuning of a particular motor to obtain even partial suppression of hunting. In still other prior art forms, the rotor angle is estimated and fed back to control motor drive current amplitude or phase. This approach is very difficult to implement. None of these prior art techniques have been effective and/or cost efficient in reducing or suppressing hunting to a satisfactory level.

As is well known, electric motors generally include a stator and a rotor. The stator includes electric coils, or windings, which, when driven by suitable electrical signals, generate a rotating magnetic field that causes rotation of the rotor about a motor axis. Typically, the rotor is supported on some form of low friction bearing for rotation within the stator.

FIG. 1 is a schematic representation of a two-phase electric motor 100. The stator of motor 100 includes two windings 110, 112, and two current sources 120, 122. Current source 120 is coupled to drive current through coil 110, and current source 122 is coupled to drive current through winding 112. Windings 110, 112 are arranged so that they generate mutually orthogonal magnetic flux vectors 130, 132, respectively, in response to the drive currents. The vectors 130 and 132 are orthogonal to the motor axis A which is perpendicular to the plane of the page in FIG. 1. In operation of the illustrated two-phase motor, current sources 120 and 122 may generate sinusoidal currents that are ninety degrees out of phase and thereby excite windings 110, 112 so that the vector sum of the flux vectors 130, 132 is a constant magnitude magnetic flux vector, known in the an as the stator flux vector 140, which rotates about the motor axis A. When, as shown in FIG. 1, the current generated by source 120 equals sin ωt and the current generated by source 122 equals cos ωt (where ω=2 πf and f is frequency), the stator flux vector rotates in a clockwise direction as shown by arrow 142.

A rotor 144 of motor 100 also has an associated magnetic flux vector, known in the an as the rotor flux vector 150. As is well known, there are many different types of electric motors, each of which uses a distinct method for generating the rotor flux vector 150. For example, in a permanent magnet motor, the rotor typically includes a permanent magnet and the flux vector associated with the permanent magnet is the rotor flux vector. In an electromagnetic motor, the rotor typically includes an electromagnet. During operation of the motor, current is delivered to the electromagnet by use of brushes or slip-rings and the magnetic flux vector associated with the electromagnet is the rotor flux vector. In hysteresis motors, the rotor flux vector is generated in part due to the inherent magnetic properties of the rotor and in part due to the magnetic interaction between the stator and the rotor.

The rotating magnetic field generated by the current passing through windings 110, 112 exerts a force on the rotor tending to cause rotation of the rotor. This force tends to align the rotor flux vector 150 with the rotating stator flux vector 140, however, the rotor flux vector 150 generally lags behind the rotating stator flux vector 140 by an angle θ, which is commonly referred to as the torque angle. The force applied by the stator to the rotor is directly proportional to the sine of the torque angle θ. Since θ is normally relatively small, the small angle approximation is normally valid and therefore, the force applied from the stator to the rotor is proportional to the torque angle θ. When viewed in this fashion, electric motors are analogous to systems composed of a mass and a linear spring (i.e., "mass-spring" systems). In a mass-spring system, the force applied to the mass by the spring, referred to as the spring force, is proportional to a linear distance (i.e., the distance between the mass and a reference point) whereas in the electric motor, the force applied to the rotor by the stator is proportional to an angle (i.e., the torque angle θ). The hunting exhibited by electric motors is analogous to the well known resonant behavior exhibited by mass-spring systems, and is caused in part by the friction between the rotor and stator, which normally varies over time.

One well known method of compensating for the resonant behavior of a mass-spring system is to construct a servo, or control, loop to damp the system. Such a control loop typically adjusts an external force applied to the mass as a function of the spring force. Since the spring force is easily observable (e.g., by measuring the distance between the mass and a reference point) such control loops are relatively easy to build and are also relatively effective. However, application of the same technique to an electric motor is generally ineffective.

A control loop for suppressing hunting in the electric motor might adjust the force applied by the stator to the rotor as a function of the torque angle θ, or alternatively as a function of the derivative of the torque angle θ with respect to time (i.e., dθ/dt). However, the use of such control loops are generally ineffective in eliminating hunting, in part because there is no simple way to measure the torque angle θ, or the derivative dθ/dt. Whereas in the case of a mass-spring system, the spring force is easily observable, in the case of an electric motor, the torque angle θ is not easily observable and instead is normally estimated by a mathematical model of the motor. However, control loops which use simple models that provide a first order approximation of the torque angle θ are generally ineffective at suppressing hunting. Hunting is complex behavior, and control loops of this type require higher order models of the motor and such models are extremely complex, expensive, and difficult to construct. As a further complication, the force applied to the rotor by the stator may not be controlled directly, and must instead be controlled indirectly by adjusting the voltage across, or the current in, the coils.

It is therefore an object of the invention to provide an improved system for suppressing hunting in electric motors that does not require estimation of the torque angle θ.

Other objects and advantages of the present invention will become apparent upon consideration of the appended drawings and description thereof.

SUMMARY OF THE INVENTION

The foregoing and other objects are achieved by the invention which in one aspect comprises a hunting suppressor for controlling an n-phase electric motor having a stator with n windings and a rotor. The hunting suppressor is responsive to a reference clock signal characterized by a frequency $f_c$ and an associated phase angle $\phi_c$. The hunting suppressor includes a variable or controlled frequency oscillator that generates n periodic drive signals, where n is an integer and the drive signals are mutually shifted in phase by 180/n degrees. Each drive signal is at a frequency $f_o$ and has an associated phase $\phi_o$. Each of the drive signals is applied, preferably by way of a power amplifier, to one of the respective n windings. A current sensor generates a feedback signal representative of one of the drive signals. The feedback signal is applied to a phase comparator which generates a control signal representative of the difference in phase of the feedback signal and an applied clock reference signal having a frequency $f_c$ and phase $\phi_c$. The control signal is applied to the oscillator and controls the oscillator so that the frequency and phase of the drive signals are locked to the clock reference signal.

The hunting suppressor may be specifically adapted for use with two-phase (n=2), three phase (n=3) or other phase electric motors. The hunting suppressor may also be particularly advantageous when used with hysteresis motors.

With the hunting suppressor of the invention, the rotor of the motor is controlled to rotate substantially at the frequency of the clock reference signal with substantially no hunting.

BRIEF DESCRIPTION OF DRAWINGS

The foregoing and other objects of this invention, the various features thereof, as well as the invention itself, may be more fully understood from the following description, when read together with the accompanying drawings in which.

Like numbered elements in each FIGURE represent the same or similar elements.

DESCRIPTION OF THE PREFERRED EMBODIMENTS

Figure 1:
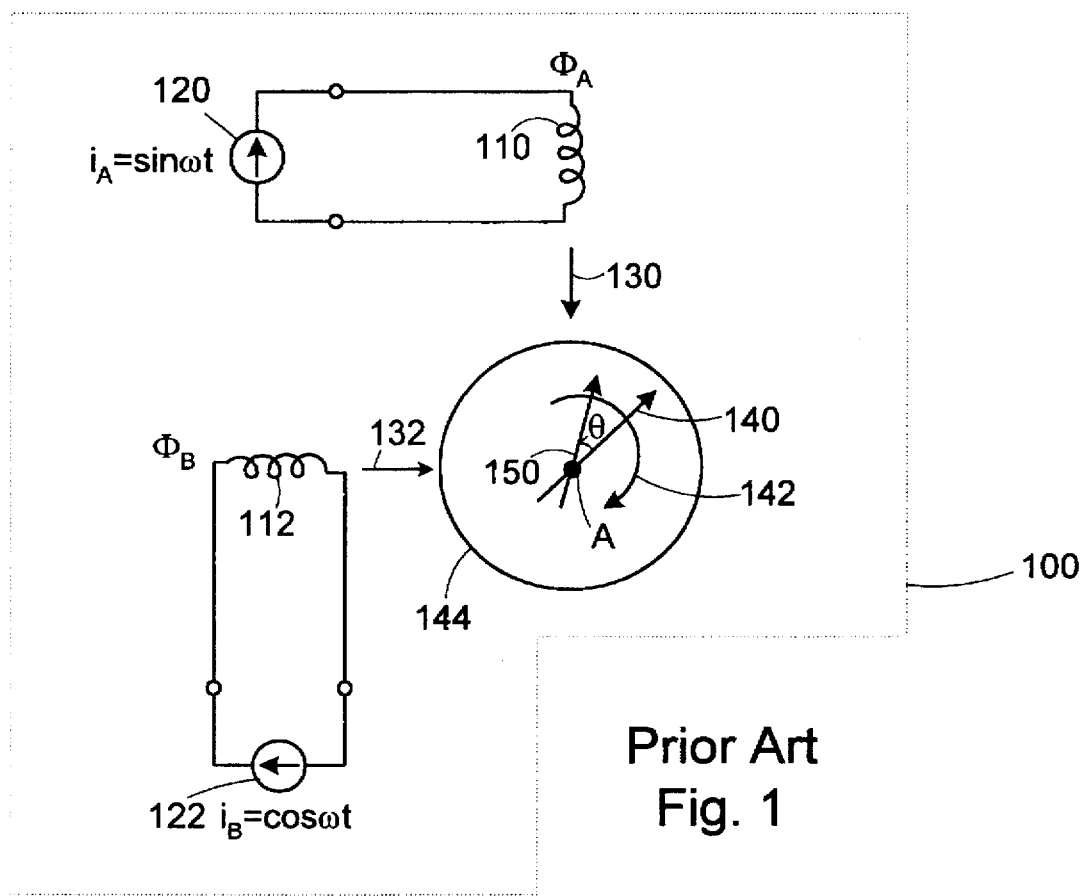
FIG. 1 is a schematic diagram of an ideal two-phase electric motor.
Figure 2:
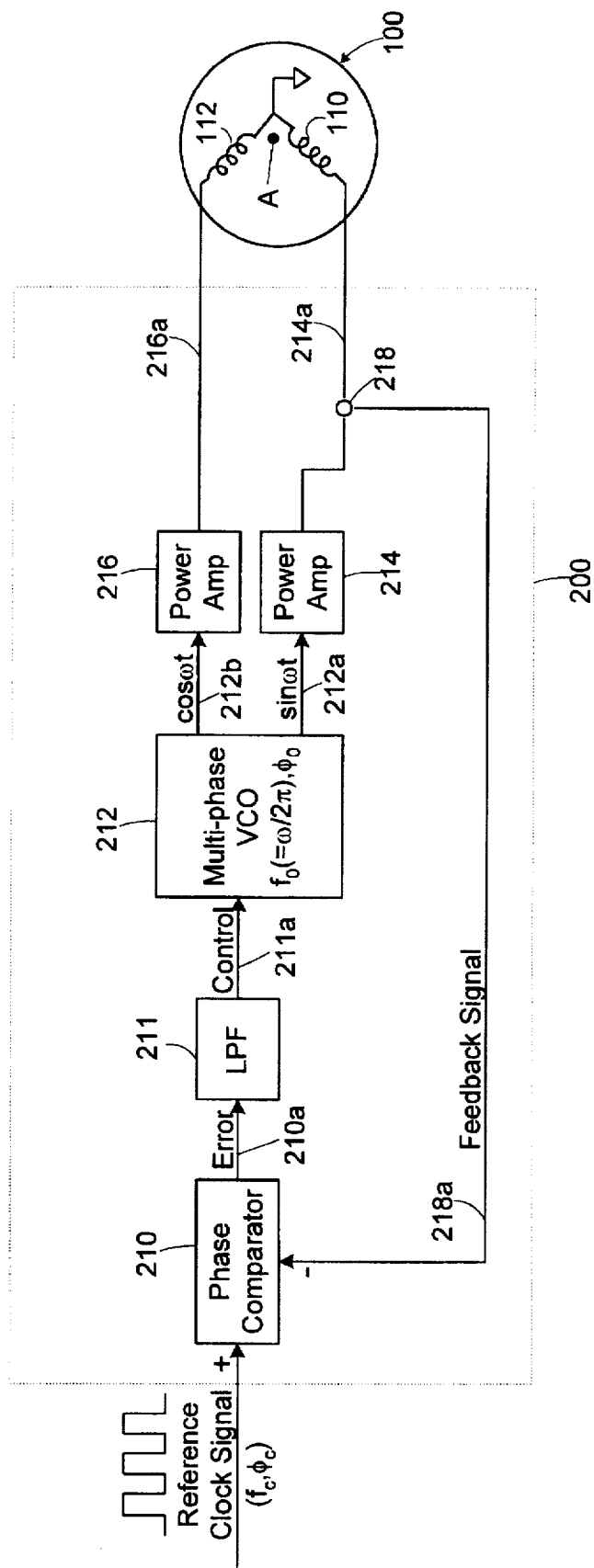
FIG. 2 is a block diagram of one preferred embodiment of a hunting suppressor constructed according to the invention.

FIG. 2 is a block diagram of an exemplary embodiment of a hunting suppressor 200 for suppressing hunting in an electric motor 100. As illustrated in FIG. 1, the motor 100 includes a stator supporting windings 110, 112 and a rotor adapted for rotation about axis A and magnetically coupled to the magnetic field generated by the stator windings.

Hunting suppressor 200 includes a phase comparator 210, a low pass filter (LPF) 211, a two-phase voltage controlled oscillator (VCO) 212, two power amplifers 214, 216, and a current sensor 218. Hunting suppressor 200 receives a reference clock signal as an input. The hunting suppressor 200 generates drive signals that are applied to windings 110, 112 of motor 100 so that the rotor of motor 100 rotates at a frequency substantially equal to the clock frequency.

The current sensor 218 provides a feedback signal on feedback line 218a. The feedback signal is representative of the current of the drive signal applied to winding 110, and is characterized by the frequency ($f_o$) and phase ($\phi_o$) of that current. The phase comparator 210 has a first input (+) terminal coupled to receive the reference clock signal, and has a second input (−) terminal coupled to receive the feedback signal from line 218a. Comparator 210 produces an error signal on line 210a representative of the difference in phase between the reference clock signal and the feedback signal. The error signal is applied by way of LPF 211 (producing a control signal on line 211a) to a control input of VCO 212. VCO 212 provides at output terminals 212a and 212b, a first sinusoidal signal and a second sinusoidal signal, respectively, where the two signals are 90 degrees out of phase. The signals at the terminals 212a and 212b are coupled to power amplifiers 214 and 216, respectively. Those amplifiers generate corresponding drive voltages on lines 214a and 216a which are applied to windings 110 and 112 respectively.

By way of example, the phase comparator may be an analog multiplier. With the implementation, the multiplier is responsive to the applied feedback signal and reference clock signal, to generate a baseband component proportional to the difference in phase between those signals, and to generate a double frequency component. The low pass filter 211 passes only the baseboard component, establishing the control signal. Alternatively, phase comparator 210 may be a state machine type comparator. This may be preferable since multiplier type phase comparators have an inherent uncertainty and can not distinguish between a particular phase difference and that same phase difference plus a multiple of ninety degrees, and state machine type phase comparators do not suffer from this uncertainty. Further, the use of a state machine type comparator facilitates implementing hunting suppressor 200 using digital technology.

In the illustrated embodiment, where motor 100 is a two-phase motor, VCO 212 is two-phase, but for a general n-phase motor, there are n separate output signals from the VCO applied by way of corresponding power amplifiers to the respective n windings of the motor. The n separate output signals are mutually shifted in phase by 180/n degrees; for example, for a two-phase VCO, there are two sinusoidal output signals where one leads the other by 90 degrees, and for a three-phase VCO, there are three sinusoidal output signals, a first leading a second by 60 degrees, and the second leading a third by 60 degrees.

VCO 212 is preferably configured so that the voltages of its output signals oscillate at the clock frequency when the control signal at its input terminal is representative of a zero phase angle difference (i.e., when the phase angles of the reference clock signal and feedback signal are equal). Further, the oscillation frequency of the output signals generated by VCO 212 increases in response to increases in the control signal (i.e., the oscillation frequency increases when the phase angle of the reference clock signal becomes greater than the phase angle of the feedback signal), and similarly, the oscillation frequency of the output signals generated by VCO 212 decreases in response to decreases in the control signal (i.e., the oscillation frequency decreases when the phase angle of the feedback signal becomes greater than the phase angle of the reference clock signal).

In operation, hunting suppressor 200 functions as a phase locked loop that uses the phase of the current in winding 110 as a control variable. Suppressor 200 locks the phase of the current flowing in winding 110 to the phase of the reference clock by controlling the phase of the voltages applied to windings 110, 112. Controlling the voltages applied to windings 110, 112 in this fashion provides a high degree of hunting suppression.

In the illustrated embodiment of hunting suppressor 200, power amplifiers 214, 216 are voltage drivers. In an alternative embodiment, amplifiers 214, 216 may be replaced with current drivers and current sensor 218 may be replaced with a voltage sensor. In this embodiment, hunting suppressor 200 uses the phase of the voltage across winding 110 as a control variable, and locks the phase of the voltage across winding 110 to the phase of the reference clock by controlling the phase of the currents applied to windings 110, 112. Controlling the currents of windings 110, 112 in this fashion also provides a high degree of hunting suppression.

As has been described, suppressor 200 may be considered as a constant frequency hunting suppressor, i.e., when the reference clock signal is stable in phase and frequency, suppressor 200 controls the rotor of motor 100 to rotate at a frequency substantially equal to the clock frequency. However, suppressor 200 may also function as a variable frequency hunting suppressor, so if the frequency of the reference clock signal is varied over time, the rotational frequency of the rotor of motor 100 will track the clock frequency. In the case of a variable frequency suppressor, VCO 212 is preferably selected so that the center frequency of VCO 212 is equal to the expected nominal frequency of the reference clock signal, and so that the frequency range of VCO 212 is as large as the desired frequency range of operation of motor 100. Further, rather than using a low pass filter, filter 211 is preferably implemented as an integrating filter that generates the control signal so that it is representative of a time integral of the error signal. Suppressor 200 is preferably initialized so that when the frequency of the reference clock signal equals the expected nominal value, the control signal generated by integrating filter 200 is a voltage at a nominal value that causes VCO 212 to oscillate at the nominal frequency. If the frequency of the reference clock signal then increases over time, the error signal applied to integrating filter 211 takes on a positive value causing the control signal to increase over time so as to increase the oscillation frequency of VCO 212 until the oscillation frequency of VCO 212 equals that of the reference clock signal. Once the frequencies of VCO 212 and the reference clock signal become equal, the error signal returns to a zero value, however, since the control signal is representative of the time integral of the error signal, filter 211 maintains the control signal at the value required to match the oscillation frequency of VCO 212 to that of the reference clock signal. Similarly, if the frequency of the reference clock signal decreases over time, the error signal takes on a negative value causing the control signal to decrease until the oscillation frequency of VCO 212 equals that of the reference clock signal. So in this form, suppressor 200 provides a high degree of hunting suppression and allows for variable frequency operation of motor 100. In other forms of suppressor 200, it may also be preferable for integrating filter 211 to incorporate a phase lead to add stability to suppressor 200, or in other embodiments, filter 200 may provide other more complex compensation filtering functions known to be useful in conjunction with phase locked loops.

Prior art systems often use reference clocks or oscillators to generate oscillating signals for driving the coils of an electric motor. However, hunting suppressor 200 provides an additional constraint on the motor by locking the phase of the current (or voltage) of one of the drive signals applied to one of the windings to the phase of the reference clock signal by controlling the phase of the voltage (or current) of the drive signals applied to the windings, and this constraint is sufficient to provide a significant degree of hunting suppression. While hunting suppressor 200 has applicability to all types of electric motors, suppressor 200 is particularly effective at suppressing hunting in hysteresis motors. Hunting in hysteresis motors results in part from the interaction between the magnetic fields of the stator and rotor. The constraints established by suppressor 200 on the electrical signals applied to the coils of the motor provide compensation for this magnetic interaction and therefore suppressor 200 provides an exceptionally high degree of hunting suppression for hysteresis motors. Further, while FIG. 2 shows hunting suppressor 200 coupled to a Wye configuration motor, those skilled in the art will appreciate that suppressor 200 may also be used to provide hunting suppression in Delta configuration motors.

Hunting suppressor 200 provides a simple and inexpensive method of suppressing hunting in electric motors without requiring the use of complex models of motor behavior to generate an estimation of the torque angle $\theta$ or of $d\theta/dt$. Rather than using the torque angle $\theta$, which is difficult to observe, hunting suppressor 200 uses and easily observable parameter, namely the phase angle of the current flowing in (or the voltage across) coil 110, as the control variable. Further, since many prior art systems use a reference clock to generate the electrical signals applied to the coils of an electric motor, these systems can easily be adapted to advantageously use hunting suppressor 200. In many cases, comparator 210, VCO 212 and sensor 218 are the only additional components required to adapt an existing prior art system to use hunting suppressor 200.

In the preferred embodiment, hunting suppressor 200 is implemented using digital technology so that phase comparator 210, filter 211, and VCO 212 are all implemented using digital components and VCO 212 includes digital-to-analog converters for generating the analog signals on lines 212a, 212b that are applied to power amplifiers 214, 216.

Further, while hunting suppressor 200 has been discussed in the context of providing hunting suppression for a two-phase electric motor, those skilled in the art will appreciate that suppressor 200 may be easily adapted to provide hunting suppression for poly-phase electric motors. For example, in an implementation of suppressor 200 for use with a three-phase motor, VCO 212 generates three output signals each having voltages that are mutually sixty degrees out of phase, and similarly in the general case of an n-phase motor, VCO 212 generates n output signals each having voltage that are mutually 180/n degrees out of phase. Regardless of the type of motor used, the feedback signal may be generated based on the current flowing in any one of the motor windings. Also, the current drive signals for the illustrated embodiment are sinusoidal. However, in alternative forms of the invention non-sinusoidal periodic drive currents may be used.

The present embodiments are therfore to be considered in all respects as illustrative and not restrictive, the scope of the invention being indicated by the appended claims rather than by the foregoing description, and all changes which come within the meaning and band of equivalency of the claims are therefore intended to be embraced therein.

What is claimed is:

1. A controller for an n-phase electric motor, said motor including a stator having n windings and a rotor, comprising:

(A) a variable frequency oscillator for generating n periodic drive signals, each of said drive signals being at a frequency $f_o$, and being mutually shifted in phase by 180/n degrees, (B) means for coupling each of said drive signals to a respective one of said n windings, said drive signals applied to said windings having a voltage phase and a current phase, and (C) PLL means for phase locking one of said voltage phase and current phase of said drive signals to an applied clock reference signal of frequency $f_c$ and phase $\phi_c$ to generate a control signal, and for controlling the other of said current phase and voltage phase of said drive signals generated by the variable frequency oscillator based on said control signal, such that said rotor rotates substantially at frequency $f_c$.

2. A controller according to claim 1 wherein said PLL means includes (i) means for generating a feedback signal representative of the drive signal coupled to one of said n windings, (ii) control signal means for generating said control signal proportional to the difference in phase of said one of said voltage phase and said current phase of said feedback signal and the phase of said clock reference signal, (iii) means for applying said control signal to said oscillator whereby said frequency $f_o$ varies in response to said control signal so that said drive signal applied to said one winding is phase locked to said clock reference signal.

3. A controller according to claim 2 wherein said control signal means includes a phase comparator means responsive to said feedback signal and said clock reference signal for generating an error signal having a baseband component and a double frequency component, and further comprising low pass filter means for rejecting said double frequency component and passing said baseband component to generate said control signal.

4. A controller according to claim 3 wherein said phase comparator means includes multiplier means wherein said multiplier means is responsive to said feedback signal and said clock reference signal to generate a signal representative of the product thereof, said product corresponding to said error signal.

5. A controller according to claim 1, wherein said PLL means phase locks said current phase of one of said drive signals to said applied clock reference signal and controls said voltage phase of said one drive signal based on said control signal.

6. A controller according to claim 1, wherein said PLL means phase locks said voltage phase of one of said drive signals to said applied clock reference signal and controls said current phase of said one drive signal based on said control signal.

7. A controller according to claim 1 wherein n=2.
8. A controller according to claim 1 wherein n=3.
9. A controller according to claim 1 wherein n=6.
10. A controller according to claim 2 wherein n=2.
11. A controller according to claim 2 wherein n=3.
12. A controller according to claim 2 wherein n=6.

13. A controller for an n-phase electric motor, said motor including a stator having n windings and a rotor, comprising:

(A) variable frequency oscillator for generating n periodic drive signals, each of said drive signals being at a frequency $f_o$ and having a phase $\phi_o$, and being mutually shifted in phase by 180/n degrees, (B) means for coupling each of said drive signals to a respective one of said n windings, and (C) PLL means for phase locking said frequency $f_o$ to an applied clock reference signal, said clock signal having a frequency $f_c$ and phase $\phi_c$, whereby said rotor rotates substantially at frequency $f_c$; said PLL means including:

(i) means for generating a feedback signal representative of the drive signal coupled to one of said n windings, (ii) control signal means for generating a control signal proportional to the difference in phase of said feedback signal and said clock reference signal; said control signal means including phase compensator means responsive to said feedback signal and said clock reference signal for generating an error signal having a baseband component and a double frequency component and low pass filter means for rejecting said double frequency component and passing said baseband component to generate said control signal, (iii) means for applying said control signal to said oscillator whereby said frequency $f_o$ varies in response to said control signal so that said drive signal applied to said one winding is phase locked to said clock reference signal.

14. A controller according to claim 13 wherein said phase comparator means includes multiplier means responsive to said feedback signal and said clock reference signal to generate a signal representative of the product thereof, said product corresponding to said error signal.

15. A controller for an n-phase electric motor, said motor including a stator having n windings and a rotor, comprising:

a variable frequency oscillator for generating n periodic drive signals, each of said drive signals having a frequency $f_o$, and being mutually shifted in phase by 180/n degrees, each of said drive signals being applied to a respective one of said n windings;

a sensor for sensing a drive signal phase $\phi_o$ comprising one of a current phase and a voltage phase of said drive signals;

a reference signal generator for generating a reference signal having a reference frequency $f_c$ and reference phase $\phi_c$; and a circuit for generating a difference phase $\phi_d$ proportional to the difference between the drive signal phase $\phi_o$ and the reference phase $\phi_c$ and for adjusting the other of the current phase or the voltage phase of said drive signals generated by the variable frequency oscillator based on the difference phase $\phi_d$, such that said rotor rotates substantially at frequency $f_c$.

16. The controller of claim 15 wherein the drive signal phase $\phi_o$ sensed by the sensor comprises the drive signal current phase and wherein the circuit adjusts the drive signal voltage phase.

17. The controller of claim 15 wherein the drive signal phase $\phi_o$ sensed by the sensor comprises the drive signal voltage phase and wherein the circuit adjusts the drive signal current phase.

* * * * *

UNITED STATES PATENT AND TRADEMARK OFFICE
CERTIFICATE OF CORRECTION

PATENT NO. : 5,694,015
DATED : December 2, 1998
INVENTOR(S) : Michael Luniewicz, et al.

It is certified that error appears in the above-identified patent and that said Letters Patent is hereby corrected as shown below:

At column 1, prior to line 4 insert:

STATEMENT OF GOVERNMENT RIGHTS.

This invention was made with Government support under Contract No. F29601-90-C-0017 awarded by the United States Department of the Air Force. The Government has certain rights in the invention.

Signed and Sealed this

Twenty-first Day of April, 1998

Attest:

BRUCE LEHMAN

Attesting Officer     *Commissioner of Patents and Trademarks*